United States Patent [19]

Minton

[11] Patent Number: 4,562,329

[45] Date of Patent: Dec. 31, 1985

[54] VARIABLE STUD WELDING CHUCK

[75] Inventor: Thomas C. Minton, Paramount, Calif.

[73] Assignee: Lewis M. Malicoat, Trustee, Escondido, Calif.

[21] Appl. No.: 641,731

[22] Filed: Aug. 17, 1984

[51] Int. Cl.⁴ .............................................. B23K 9/20
[52] U.S. Cl. ...................................... 219/99; 219/98; 279/42
[58] Field of Search ...................... 219/98, 99; 279/42, 279/41 R, 32, 99, 100, 101; 411/307

[56] References Cited

U.S. PATENT DOCUMENTS

| | | | |
|---|---|---|---|
| 1,410,421 | 3/1922 | Steele et al. | 219/98 |
| 2,018,263 | 10/1935 | Ito | 219/99 |
| 2,098,675 | 11/1937 | Procunier | 279/42 |
| 2,462,882 | 3/1949 | Martin | 219/99 |
| 2,610,278 | 9/1952 | Graham | 219/98 |
| 4,045,643 | 8/1977 | Burkert et al. | 219/98 |

Primary Examiner—Clifford C. Shaw
Attorney, Agent, or Firm—Charles H. Thomas

[57] ABSTRACT

An industrial stud welding machine is provided with a chuck which defines a work piece receiving orifice of infinitely variable diameter. The stud welding chuck is thereby able to accommodate studs of different diameters, and is also adjustable to compensate for wear resulting from extended use. The stud welding chuck employs a barrel having an annular wall in which longitudinal slots are defined. The barrel is tapered and threaded externally. A collet encircles the barrel and is treadably engaged therewith. Advancement of the collet in one longitudinal direction squeezes the edges of the barrel walls together to reduce the work piece receiving orifice diameter. Advancement of the collet in the opposite direction along the barrel allows the work piece receiving orifice to open to a larger diameter.

13 Claims, 10 Drawing Figures

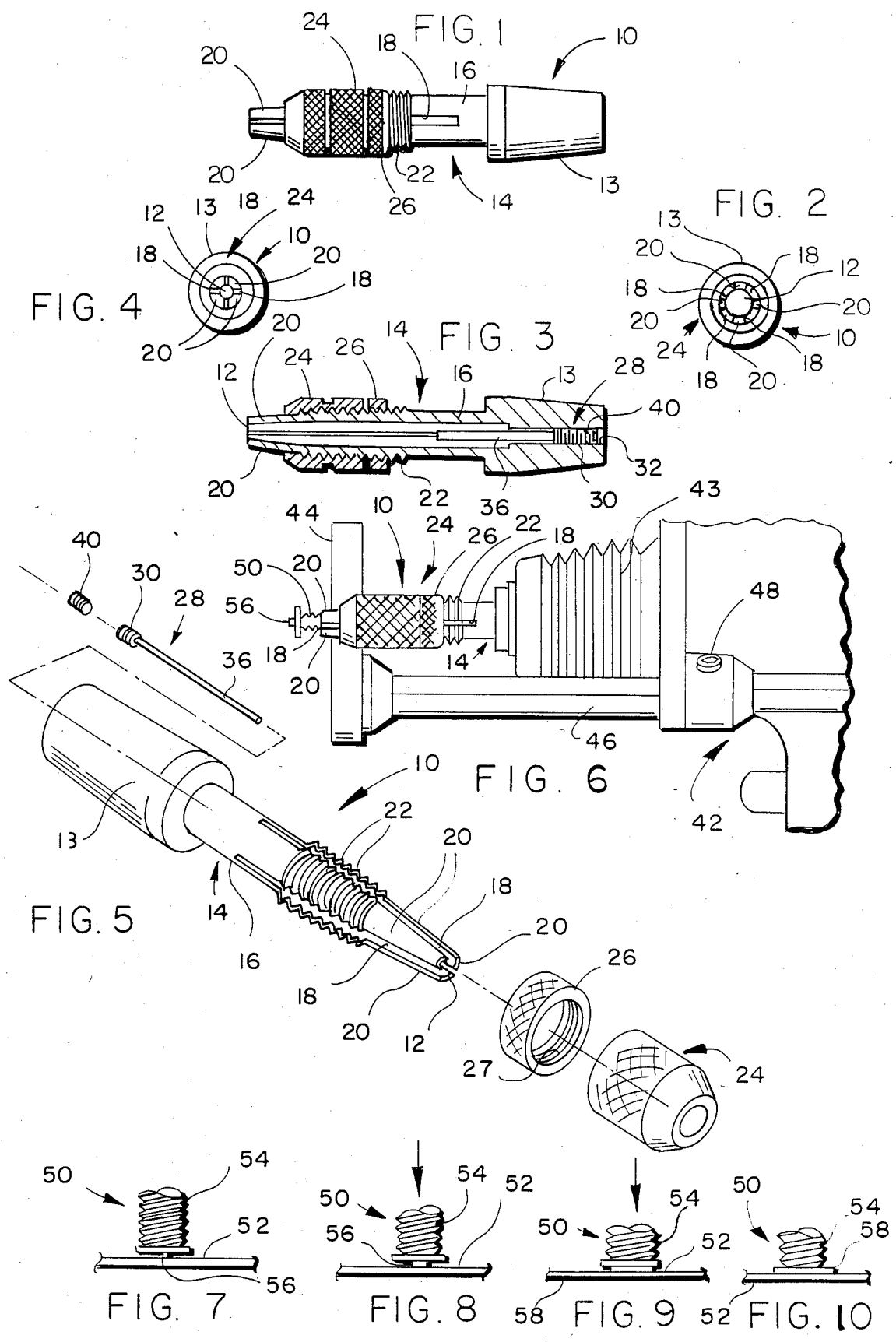

VARIABLE STUD WELDING CHUCK

BACKGROUND OF THE INVENTION

1. Field of the Invention

The present invention relates to a method of stud welding and an improved stud welding chuck.

2. Description of the Prior Art

Stud welding is a process which finds widespread industrial application for fastening metal studs on metal surfaces. A particular advantageous feature of stud welding in attaching studs and other fasteners to metal surfaces is that all operations can be performed from one side of the metal surface involved. Therefore, studs can be fastened to metal surfaces which are not accessible from the opposite side.

A stud welding machine typically employs an alternating current to direct current transformer as a source of electrical power. The direct current electrical power is typically provided through electrical cables to a hand-held stud welding gun, shaped somewhat like a pistol. The stud welding gun carries a chuck into which elongated stud fasteners are inserted for placement on a metal surface. The stud chuck is constructed of metal, as are the stud fasteners and the surfaces to which the stud fasteners are to be attached.

Each stud fastener is equipped with an elongated, projecting shank and a base to be fastened to a metal surface. The free end of the shank is inserted into the stud welding chuck, and a short, but very large surge of current is directed through the chuck and through the shank of the workpiece to the workpiece base and to the metal surface to which the stud is to be welded. The surge of electrical current effectuates localized melting of the base of the stud and of the metal surface against which the stud is positioned and to which it is to be attached. The molten metal rapidly cools leaving the stud shank projecting from the surface to which it is then attached. The stud welding gun is then drawn back from the metal shank, thereby freeing the stud welding chuck from the welded stud shank. Another stud is inserted into the stud welding gun and the process is repeated for any number of studs to be welded.

There are two major types of stud welding processes. In capacitor discharge stud welding a very large capacitor is employed to store direct current electrical power. One end of the stud to be welded is inserted into a snugly fitting stud welding chuck. The stud welding chuck is thereby used to hold the stud in position during the welding operation. A small, axial pin projects outwardly from the base of the stud, away from the stud welding chuck. The stud is pressed against the metal surface at the location at which it is to be attached. A spring mechanism acting between the chuck and the stud welding gun body urges the stud toward the surface to which it is to be welded. Depression of the stud welding gun trigger discharges the capacitor through the chuck and through the stud to the metal surface. The brief but large surge of electrical current melts the pin on the base of the stud and the area of the metal surface in contact therewith. As melting is initiated and progresses the spring acting between the stud welding gun body and the chuck urges the stud toward the metal surface. The molten metal spreads across the interface between the metal surface and the base of the chuck. Following the capacitor discharge the molten metal cools, thereby leaving the stud firmly welded to the metal surface. The stud welding gun is drawn back from the upstanding stud shank, since the stud shank is held in the chuck only by frictional engagement.

Another form of stud welding is arc welding. Arc welding is used in heavier duty applications for larger fasteners and rougher work surfaces, as contrasted with capacitor discharge stud welding. In an arc welding system power is derived from a rectifier or a motor generator. As in the capacitor discharge stud welding process, the shank of the stud to be arc welded is inserted into the stud welding chuck in the stud welding gun. The base of the fastener to be welded is pressed against the work surface with spring loading. A ceramic shield on the stud welding gun surrounds the base of the stud to be welded. When the stud welding gun trigger is pulled the stud welding chuck is momentarily lifted slightly from the surface to which it is to be welded, as a surge of direct current electric power is released to arc between the base of the stud and the surface to which the stud is to be fastened. The power dissipated in the arc melts the base of the stud and the adjacent area of the work surface. The ceramic shield aids in concentrating the heat at the interface between the base of the stud and the metal surface to which the stud is to be attached to ensure a firm, secure weld. As the base of the stud and the area of the metal surface adjacent thereto are melted, the chuck is again spring biased toward the metal surface, thereby plunging the stud into the molten metal. The molten metal rapidly cools, thereby leaving the stud projecting from the metal surface.

A number of different models of stud welding systems are manufactured by Nelson Stud Welding which is located at 28th St. and Toledo Ave., Lorain, Ohio 44055.

One problem which has persisted in employing stud welding as a means for attaching metal studs to metal surfaces has been that a different stud welding chuck has been necessary for each different diameter stud to be welded. A stud welding machine operator must therefore change the stud welding chuck in the stud welding machine each time studs of a different diameter are to be welded. Conventional chucks are constructed with a tapered, frusto-conical end, which is inserted into a correspondingly tapered recess in a spindle in the stud welding gun. To change a chuck, the user must insert a screwdriver in a slot in the stud welding gun behind the chuck and use the screwdriver as a lever to push the chuck out of fricitional engagement with the spindle. A new chuck, designed for the diameter of stud fastener to be stud welded, is then placed into the tapered recess in the spindle and tapped lightly to ensure that the chuck has properly seated. The stud to be welded is then placed into the chuck. A spacing leg must then be adjusted for the new chuck. The spacing leg carries a footpiece which limits the extent to which the stud welding gun will be forced toward the surface upon which studs are to be attached during the stud welding process. The leg carrying the footpiece must be adjusted so that the base of the stud, and any projection therefrom, extends approximately ⅛ inch beyond the bottom of the footpiece.

The foregoing steps in changing chucks are quite time consuming. It is evident that when studs of different diameters are to be attached to a metal surface there is a considerable loss in productivity due to the time involved in changing chucks.

A further disadvantage of conventional stud welding chucks is that they tend to wear out relatively rapidly. There is considerable friction on the inner surface of the chuck barrel when studs are inserted for placement, and when the stud welding gun is withdrawn from the installed stud. Once the barrel has worn to a certain point, the studs for which the chuck is designed are too loose. Arcing then occurs at the interface of the stud with the chuck barrel during the welding process. Once arcing commences, the chuck rapidly burns out. A typical prior art chuck will last for approximately 3,000 welds.

SUMMARY OF THE INVENTION

In one aspect, the present invention may be considered to be a stud welding chuck which receives a work piece receiving orifice of a selectively variable diameter which can be used in both capacitor discharge and arc stud welding processes. In another broad aspect the invention may be considered to be an improved stud welding process. As with the conventional stud welding process, cylindrical metal fasteners are attached to metal surfaces. The metal fasteners are inserted into a workpiece receiving orifice of a chuck and electrical current is passed through an interface between each of the metal fasteners and the metal surfaces to which they are to be attached to create a weld therebetween. According to the improvement of the invention, however, one selectively varies the diameter of the workpiece receiving orifice to accomodate metal fasteners of different diameters.

A principal advantage of the present invention is that a single stud welding chuck can be employed to accomodate studs within a range of different diameters. According to one embodiment of the invention a stud welding chuck is designed to accept any diameter stud between $\frac{1}{8}$ of an inch and $\frac{1}{4}$ of an inch. Such an embodiment of the chuck of the invention replaces nine different conventional chucks, since nine different chucks are required to accept the commercially available studs having diameters within this range.

Preferably, the diameter of the workpiece receiving orifice of the chuck of the invention is infinitely variable. That is, the diameter of the workpiece receiving orifice is not varied in incremental steps, but rather is varied continuously to any diameter within the design range of the chuck. In this manner, once the chuck begins to wear due to friction of the studs therewith, the diameter of the workpiece receiving orifice can easily be reduced slightly, as required, so as to prevent arcing between the chuck and the stud during the stud welding process. Chucks according to the present invention can be used for a far greater number of welds than can conventional chucks. Indeed, the embodiment of the invention tested has been used for more than 3,000 welds, and shows practically no signs of wear. The design limits for chucks according to the invention is not yet known, since none have yet worn out.

These and other advantages will become more readily apparent by reference to the accompanying drawings.

DESCRIPTION OF THE DRAWINGS

FIG. 1 is a side elevational view of a stud welding chuck according to the invention.

FIG. 2 is a front elevational view of the chuck of FIG. 1 adjusted to have a large workpiece receiving orifice.

FIG. 3 is a side sectional view of the chuck of FIG. 1.

FIG. 4 is a front elevational view of the chuck of FIG. 1 adjusted to have a small workpiece receiving orifice.

FIG. 5 is an exploded perspective view of the chuck of FIG. 1.

FIG. 6 illustrates the chuck of FIG. 1 installed in a stud welding gun.

FIGS. 7-10 illustrate the manner of attachment of a stud in the stud welding process.

DESCRIPTION OF THE EMBODIMENT AND IMPLEMENTATION

FIG. 1 illustrates a chuck 10, which defines a workpiece receiving orifice of selectively variable diameter. The workpiece receiving orifice 12 is visible in FIG. 2, where the chuck 10 has been adjusted so that the orifice 12 is large. In contrast, the orifice 12 has been adjusted to a small diameter in FIG. 4.

The chuck 10 is formed as an annular structure from an alloy of berylium, copper and mild 10—10 steel. The chuck 10 is formed with a frusto-conical base 13 having a tapered surface, and a barrel 14. The barrel 14 has an annular wall 16 in which longitudinal slots 18 are defined to extend from the workpiece receiving orifice 12 and which divide the walls 16 thereat into four resilient, tapered fingers 20.

The barrel 14 has threads 22 defined on its outer surface, and an annular collet 24 is constructed with internal threads which are engageable with the threads 22 of the barrel 14. The annular collet 24 is longitudinally positionable along the barrel 14 by the screw action of the interengaged threads of the collet 24 and the barrel 14. Rotation of the collet 24 in one direction carries the collet 24 longitudinally along the barrel 14 in one direction, while rotation of the collet 24 in the opposite direction reverses the direction in which the collet 24 is longitudinally carried.

The inner surface of the collet 24 bears radially inwardly against the annular barrel wall 16 at a tapered interface therewith. That is, either the outer surface of the barrel 14 or the inner surface of the collet 24 may be tapered in a generally frustoconical fashion. Alternatively, portions of both the outer surface of the barrel 14 and the inner surface of the collet 24 may be so tapered.

The relative longitudinal position of the collet 24 on the barrel 14 determines the diameter of the workpiece receiving orifice 12. In the positions of FIGS. 1 and 3 the collet 24 has been advanced considerably to the left, thus allowing the fingers 20 to push radially outwardly, thus enlarging the work piece receiving opening 12 to the extent depicted in FIG. 2. If the collet 24 is turned in threaded engagement with the threads 22 on the outer surface of the barrel 14 to advance the collet 24 to the right, as viewed in FIGS. 1 and 3, the work piece receiving orifice 12 will be narrowed. That is, due to the tapered interface between the collet 24 and the barrel 14, advancement of the collet 24 to the right, as viewed in FIGS. 1 and 3, will elastically deflect the fingers 20 radially inwardly, so as to decrease the diameter of the work piece receiving orifice 12. When the collet 24 has been advanced to the right to achieve full engagement with the threads 22, the work piece receiving orifice 12 will be reduced in diameter, as depicted in FIG. 4.

In the embodiment of the chuck 10 illustrated in FIG. 3, the outer surface of the wall 16 of the barrel 14 is tapered to have a narrower diameter at its left extremity than at the right-hand end of the threads 22. Likewise, the pitch diameter of the threads on the interior surface of the collet 24 is smaller at the left end of the collet 24 than at the right, as viewed in FIG. 3. Rotational and longitudinal advancement of the collet 24 along the barrel 14, from left to right as viewed in FIG. 3, will cause the collet to radially compress the fingers 20 therewithin, although the deformation is completely elastic. This will reduce the diameter of the workpiece receiving orifice 12 to receive stud fasteners of small diameter. If the collet 24 is backed off from full engagement with the threads 22 on the outer surface of the barrel 14, the resilient fingers 20 will spread radially outwardly to the limit allowed by the encircling annular collet 24. This results in an increase in the diameter of the workpiece receiving orifice 12.

Preferably, some releasable locking means is provided for releasably holding the collet 24 at a selected longitudinal position along the barrel 14. This function may be performed by an annular jamb nut 26, which is also internally threaded at 27 and engaged with the threads 22 of the barrel 14. To adjust the diameter of the workpiece receiving orifice 12, the jamb nut 26 is backed off away from the collet 24 to create a longitudinal separation therebetween. The collet 24 is then threadably advanced in the desired direction until the diameter sought for the workpiece receiving orifice 12 has been established. At this time the jamb nut 26 is then screwed in the reverse direction, and advanced longitudinally and in rotation toward the collet 24. Advancement is continued so that the jamb nut 26 bears longitudinally against the collet 24, thereby immobilizing the collet 24 from movement, either rotational or longitudinal, relative to the barrel 14.

Other forms of locking mechanisms will also become readily apparent. For example, the collet 24 and barrel 14 can be constructed with conflicting threads. As an example, the threads 22 on the outer surface of the barrel 14 can be formed 18 to an inch, while the internal threads on the collet 24 can be formed 20 to an inch. With only such a slight conflict in the number of threads per inch, the collet 24 is still threadably engageable with the threads 22. However, the mismatch will enhance the frictional engagement between the threads so that the collet 24 will not rotate as a result of vibration, but rather will remain locked at its position of adjustment until forceably readjusted by the stud welding machine operator.

Preferably also, the chuck 10 employs a workpiece stop 28, which is located within the chuck 10 and terminates at a spaced longitudinal separation from the variable diameter orifice 12. Specifically, the workpiece stop 28 is formed with an externally threaded base 30 which is treadably engaged in a tapped bore 32 in the frusto-conical base 13 of the chuck 10. A longer, narrower limiting pin 36 extends axially toward the workpiece receiving orifice 12, but stops short of that opening. The distance by which the cantilevered end of the work piece limiting pin 36 and the workpiece receiving orifice 12 are separated is determined by the position of the threaded base 30 of the workpiece stop 28 within the tapped bore 32 of the base 13 of the chuck 10. Threaded advancement of the base 30 of the workpiece stop 28 toward the left, as viewed in FIG. 3, will reduce the separation between the end of the workpiece limiting pin 36 and the workpiece receiving orifice 12. Conversely, threaded advancement of the base 30 toward the right within the tapped bore 32 will increase the distance of separation. The distance of separation is selected so that a stud fastener positioned within the barrel 14 will be halted in its insertion by the end of the work piece limiting pin 36 and will extend outwardly beyond the end of the chuck. The stud fastener is inserted into the barrel 14 until it meets the end of limiting pin 36.

The chuck 10 also employs a set screw 40 which is threadably engaged in the axial bore 32 in the base 13. The set screw 40 is equipped with an Allen head fitting at its accessible end. Once the base 30 has been threadably advanced to the desired position within the bore 32, the set screw is threadably advanced toward the base 30 until it resides in abutment thereagainst. The set screw 40 is then tightened against the base 30, so that the work piece stop 28 is immobilized from both longitudinal and rotational movement within the structure of the chuck base 13. Both the set screw 40 and the base 30 of the workpiece stop 28 are equipped with Allen head fittings so that they may be threadably advanced in either direction in the tapped bore 32 through the use of an Allen head wrench.

The chuck 10 is inserted into the conventional spindle 43 of a stud welding gun 42 in a conventional fashion, as illustrated in FIG. 6. That is, the frusto-conical base 13 of the chuck 10 is adapted to fit into the corresponding wells of conventional stud welding gun spindles. As with conventional stud welding guns, a generally flat footpiece 44 is mounted perpendicular to the alignment of the chuck 10 upon a leg 46 which is aligned parallel to the disposition of the chuck 10. As with conventional chucks, the longitudinal position of the footpiece 44 can be adjusted by loosening a set screw 48 on the stud welding gun 42. The footpiece 44 is locked in the desired longitudinal position by retightening the set screw 48.

The stud welding gun 42 is a conventional stud welding machine for sequentially receiving cylindrical metal workpiece or fasteners, one of which is depicted at 50 in FIG. 6. The fastening studs 50 are sequentially positioned in the chuck 10 and in juxtaposition against metal surfaces to which they are to be attached, such as the metal surface 52 depicted in FIGS. 7–10. The fastening stud 50 is of a conventional design for use in a capacitor discharge stud welding gun. That is, the stud fastener 50 is equipped with a shank 54 which is received within the barrel 14 of the chuck 10 and a pin 56 projecting from the base of the stud fastener 50, as depicted in FIGS. 7 and 8. The tip 56 is formed of a material which will melt with the conventional discharge current of the capacitor discharge stud welding machine. A typical capacitor discharge welding machine will pass about 4,000 amperes of 175 volt direct current through the stud fastener 50 to the metal plate 52 in a period of about 6 milliseconds. With the electrical discharge a spring within the stud welding gun 42, tending to force the chuck 10 to the left as viewed in FIG. 6, presses the stud fastener 50 downwardly toward the metal plate 52 in FIG. 8 concurrently with the electrical discharge. The pin 56 melts, as does the area of the metal plate 52 in contact therewith, as illustrated in FIG. 9. Molten metal spreads laterally, as depicted in FIG. 9, and solidifies to form a weld indicated at 58 in FIG. 10.

The otherwise conventional stud welding process is improved, according to the invention, by selectively varying the diameter of the workpiece receiving orifice 12 to accomodate metal fasteners 50 of different diameters. It is necessary only to loosen the jamb nut 26 and manually rotate the collet 24 without removing the chuck 10 from the stud welding gun 42 of FIG. 6. The collet 24 is rotatably and longitudinally advanced to the left to enlarge the diameter of the work piece receiving orifice 12, or to the right to reduce the diameter of the orifice 12, both as viewed in FIG. 3, depending upon the diameter of the stud fastener 50 which is to be welded to the metal plate 52. The threaded interengagement of the collet 24 with the threads 22 on the barrel 14 allows the diameter of the orifice 12 to be adjusted continuously in an infinitely variable fashion. Once the desired diameter is achieved the jamb nut is again tightened to bear longitudinally in abutment against the collet 24.

If the workpiece stop 28 is employed, the longitudinal position of the end of the stopping pin 36 can be adjusted. To do so, the chuck 10 must be removed from the spindle of the stud welding gun 42 in the conventional manner. The set screw 32 is removed with an Allen wrench and the position of the base 30 of the workpiece stop 28 is advanced in the desired direction, also by means of an Allen wrench. Once the desired separation between the end of a stopping pin 36 and the workpiece orifice 12 is achieved the set screw 40 is screwed back into the tapped bore 32 to immobilize the workpiece stop 28. The chuck 10 is then returned to the stud welding gun spindle 43. Since the same chuck 10 is employed, there is no necessity for adjusting the longitudinal position of the workpiece.

Undoubtedly, numerous variations and modifications of the invention will become readily apparent to those familiar with the industrial technique of stud welding. Accordingly, the scope of the invention should not be construed as limited to the specific embodiment and method of implementation depicted and described, but rather is defined in the claims appended hereto.

I claim:

1. In a process for stud welding employing a machine for sequentially receiving cylindrical metal workpieces of different diameters and for sequentially positioning said workpieces in juxtaposition against metal surfaces and for passing an electric current through each of said workpieces and said metal surfaces to weld said metal workpieces thereto, the improvement comprising employing with said machine a stud welding chuck defining a workpiece receiving orifice of selectively variable diameter in which said chuck has a barrel formed with an annular externally threaded wall in which longitudinal slots are defined extended from said workpiece receiving orifice to delineate a plurality of resilient fingers an in which an annular collet encircles said barrel and is interiorally threaded with threads which engage with said threads on said barrel wall in a conflicting manner, and varying the diameter of said workpiece receiving orifice by longitudinally adjusting the position of said collet along said barrel so that said collet bears radially inwardly against said externally threaded annular barrel wall at a tapered interface therewith so that said fingers selectively vary the diameter of said workpiece receiving orifice so as to snugly receive workpieces of a selected diameter.

2. A process according to claim 1 further comprising releasably locking said workpiece receiving orifice at a selected diamter.

3. A stud welding process according to claim 1 further comprising providing within said chuck a longitudinally adjustable workpiece stop, and adjusting the location of said stop within said chuck to create a selected longitudinal spatial separation between said stop and said workpiece receiving orifice.

4. In a stud welding process for attaching cylindrical metal fasteners to metal surfaces in which said metal fasteners are inserted into a workpiece receiving orifice of a chuck and electrical current is passed through an interface between each of said metal fasteners and said metal surface to create a weld therebetween, the improvement comprising selectively varying the diameter of said workpiece receiving orifice by using a chuck which has a barrel formed with an annular externally threaded wall in which longitudinal slots are defined extending from said workpiece receiving orifice to delineate a plurality of resilient fingers, and in which an annular collet encircles said barrel and is interiorally threaded with threads which engage with said threads of said barrel wall in a conflicting manner, and longitudinally adjusting the position of the collet along said barrel so that said collet bears radially inwardly against said externally threaded annular barrel at a tapered interface therewith to selectively vary the size of said workpiece receiving orifice to accomodate metal fasteners of different diameters.

5. A stud welding process according to claim 4 further comprising releasably locking said workpiece receiving orifice at selected diameters.

6. A stud welding chuck which defines a workpiece receiving orifice of a diameter which can be selectively varied to receive workpieces of different diameters in which said chuck has a barrel formed with an annular externally threaded wall in which longitudinal slots are defined extending from said workpiece receiving orifice to delineate a plurality of resilient fingers, and an annular collet encircles said barrel and is interiorally threaded with threads which engage with said threads of said barrel wall in a conflicting manner, and said collet is threadably engaged with said barrel and is longitudinally positionable therealong to bear radially against said externally threaded annular barrel wall at a tapered interface therewith.

7. A stud welding chuck according to claim 6 further comprising releasable locking means for releasably holding said collet at a selected longitudinal position along said barrel.

8. A stud welding chuck according to claim 7 in which said releasable locking means is comprised of a jamb nut.

9. A stud welding chuck according to claim 6 in which the diameter of said workpiece receiving orifice is continuously variable.

10. A stud welding chuck according to claim 6 further comprising a workpiece stop located within said barrel and in spaced separation from said workpiece receiving orifice.

11. A stud welding chuck according to claim 10 further comprising means for adjusting the distance of spaced separation of said workpiece stop from said workpiece receiving orifice.

12. A stud welding chuck according to claim 11 in which said stop is threadably engaged in a tapped axial bore in said chuck.

13. A stud welding chuck according to claim 12 further comprising a set screw threadably engaged in said axial bore and positionable to bear longitudinally against said workpiece stop.

* * * * *